United States Patent [19]

Sarangapani

[11] Patent Number: 5,683,829
[45] Date of Patent: Nov. 4, 1997

[54] REDOX PROMOTERS FOR METHONOL FUEL CELLS

[76] Inventor: Shantha Sarangapani, 17 Rose Marie La., Walpole, Mass. 02081

[21] Appl. No.: 716,915

[22] Filed: Sep. 11, 1996

Related U.S. Application Data

[63] Continuation of Ser. No. 447,114, May 22, 1995, abandoned.

[51] Int. Cl.$^6$ .................................................. H01M 4/86
[52] U.S. Cl. ........................ 429/42; 429/44; 204/290 R; 204/292
[58] Field of Search ........................ 204/291, 290 R, 204/292, 293; 429/42, 43, 44

[56] References Cited

U.S. PATENT DOCUMENTS

| | | | |
|---|---|---|---|
| 3,291,753 | 12/1966 | Thompson | 429/43 |
| 4,407,905 | 10/1983 | Takeuchi et al. | 429/42 |
| 4,769,296 | 9/1988 | Sterzel | 429/12 |
| 4,828,941 | 5/1989 | Sterzel | 429/33 |
| 5,171,644 | 12/1992 | Tsou et al. | 429/42 |
| 5,223,102 | 6/1993 | Fedkiw et al. | 204/78 |

OTHER PUBLICATIONS

Butte et al, The Synthesis of Some Pyridylpyridazines and Pyrimidines Sep. 1961, pp. 4690–4692.

Geldard et al, The Organic Chemistry of a New Weak Field Tridentate Chelating Agent. 3,5–D1(2–Pyridyl)–1,2,4–Triazole Jan. 1965, pp. 318–319.

Rillema et al, Multimetallic Ruthenium(II) Complexes Based on Biimidazole and Bibenzimidazole: Effect of Dianionic Bridging Ligands on Redox and Spectral Properties, vol. 29 #2, 1990, 167–173, Inorganic Chemistry No month available.

Fieselmann et al, Synthesis, Electron Paramagnetic Resonance, and Magnetic Studies of Binuclear BIS(N$^5$–Cyclopentadienyl) Titanium(III) Compounds with Bridging Pyrazolate, Biimidazolate, and Bibenzimidazolate Anions, vol. 8, 1978, pp. 2078–2084, Inorganic Chemistry No month available.

Che et al, Ruthenium(III) Tertiary Amine Complexes vol. 24, 1985, pp. 1061–1062, Inorganic Chemistry No month available.

Che et al, A High Valent Ruthenium(VI) Dioxo Cation of 1,4,8,11–Tetramethyl–1,4,8,11–Tetraazacyclotetradecane, vol. 24, 1985, pp. 1797–1800, Inorganic Chemistry No month available.

Watanabe et al, Applications of the Gas Diffusion Electrode to a Backward Feed and Exhaust (BFE) Type Methanol Anode, vol. 199, 1986, pp. 311–322, J. Electroanal Chemistry No month available.

Braunstein et al, Spectroscopic and Electrochemical Properties of the Dimer Tetrakis (2,2'–Bibyridine) (U–2, 3–Bis(2–Pyridyl)Pyrazine) Diruthenium(II) and its Monomeric Analogue vol. 23, 1984, pp. 857–864, Inorganic Chemistry No month available.

Giner, Electrochemical Reduction of $CO_2$ on Platinum Electrodes in Acid Solutions vol. 8, 1963, pp. 857–865, Electrochimica Acta No month available.

Watanabe et al, A Gas Diffusion Electrode for Oxygen Reduction Working at 100% Utilization of Catalysts Clusters vol. 183, 1985, pp. 391–394, J. Electroanal Chemistry No month available.

Jahnke et al, "Organic Dyestuffs As Catalysts For Fuel Cells", Topics In Current Chemistry, 61, 133 (1970) No month available.

*Primary Examiner*—Kathryn L. Gorgos
*Assistant Examiner*—Kishor Mayekar

[57] ABSTRACT

The invention refers to a fuel cell electrode for oxidation preferably methanol or methanol reformate in a fuel cell with acid electrolytes. The electrode material comprises of a) carbons modified by the chemisorption or covalent attachment of metallocomplexes, over which a noble metal catalyst such as platinum is deposited, b) carbon-noble metal systems mixed with metallocomplexes, and c) mixtures of noble metal blacks and metallocomplexes. An improvement of 100–200 mV is seen over controls using platinum alone in full tests using methanol and oxygen or air. The advantages of using the disclosed promoters is the use of low loaded (20% Pt on carbon) electrodes rather than pure noble metal or alloy blacks.

12 Claims, 18 Drawing Sheets

COMPARISON OF THE POLARIZATION OF RuBIIMIDAZOLE (10%) WITH 20% PT/C, AND Pt BLACK CONTROLS

TETRAKIS PYRIDYL PYRAZINE

M = Ru, Sn, Fe OR Co
METALLO PHTHALOCYANINE

M = Ru, Fe, Sn OR Co
X = $NH_2$, F, CN OR H
METALLO PORPHYRINS

X = $CH_3$, H
1,4,8,11-TETRAZACYCLO TETRADECANE CYCLAM

BIPYRIDYLPYRAZINE

BIPYRIMIDINE

BIS-DIPYRIDYLPYRIDAZINE

BIIMIDAZOLE

BIBENTIMIDAZOLE

DIMETHYL
BIIMIDAZOLE

POLYETHYLENEIMINE-BRANCHED

POLYETHYLENEIMINE-LINEAR

CYCLIC VOLTAMMOGRAM OF Ru₂ BIIMIDAZOLE

CYCLIC VOLTAMMOGRAM OF Ru BIIMIDAZOLE

CYCLIC VOLTAMMOGRAM OF $Ru_2(dppn)_2Cl_4$

CYCLIC VOLTAMMOGRAM OF $Ru_2 TPPZCl_4$

BEST SINGLE CELL PERFORMANCE OF Rubpm PROMOTED ELECTRODE

BEST PERFORMANCE AT 0.76 mg/cm² ANODE LOADING

COMPARISON OF LOW LOADED DMFC ANODES

REDOX PROMOTERS FOR METHONOL FUEL CELLS

This is a continuation of application Ser. No. 08/447,114 filed on May 22, 1995, now abandoned.

BACKGROUND OF THE INVENTION

Fuel cells are electrochemical cells that oxidize certain fuel molecules at the anode and reduce an oxidant such as oxygen or air. From thermodynamics point of view the fuel cells constitute the most efficient form of conversion of fuel into electrical energy.

Direct Methanol fuel cell powered vehicles (DMFC) are foreseen as the choice of the future because of its environmentally benign combustion products, potential for high efficiency and above all for the unlimited supply of methanol in the United States. The major obstacle in the development of methanol fuel cells is the methanol electrode, particularly the platinum catalyst for methanol oxidation. Quick loss of activity due to the adsorption of poisoning intermediates related to carbon monoxide like species is well established.

It is well understood at this point that a promoter metal capable of oxygen transfer to the platinum or that could oxidize the adsorbed residues from methanol oxidation ideally should improve the performance of the methanol oxidation electrode. Adsorbed water appears to play an important role in this process. Recently, platinum ruthenium alloys have shown promise as such a promoter metal. The mechanism invoked is as follows:

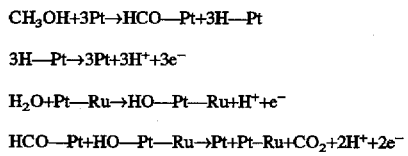

Dissociative water adsorption on Pt alone occurs at about +0.8V vs. NHE at 50° C. and this is why Pt alone is not a good catalyst for methanol oxidation. The reaction rate of methanol oxidation in the presence of promoting alloy atoms is assumed to be proportional to the number of Ru sites located at the nearest neighbor.

The oxidation of small organic molecules at a platinum electrode occurs through the formation of a chemisorbed residue, which poisons the Pt sites and makes further adsorption of reactants difficult. Consequently, the catalytic activity falls with time. The reformate gas, which is predominantly hydrogen and carbon dioxide, contains several impurities such as formaldehyde, formic acid, in ppm levels. However, in a fuel cell operating over several thousand hours, the adsorption of even small quantities can result in the loss of cell performance. Even with pure hydrogen/$CO_2$, a problem exists in the form of "Reduced $CO_2$," a concept introduced by J. Giner in *J. Electrochimica Acta*, 8, 857 (1963). At the hydrogen electrode potential, carbon-dioxide can get reduced forming an adsorbed intermediate that is similar to the adsorbed intermediate formed during the oxidation of small organic molecules. The nature of the intermediates formed from the reduction of $CO_2$ is identical to that formed during the oxidation of $CO_2$, methanol, formaldehyde, etc. Therefore, a promoter that works well with methanol oxidation, should do well in tolerating impurities as well as the 30% $CO_2$ present in the reformate.

This invention relates to macrocyclic complexes of well-defined stereochemistry in stable ligand environments and redox potentials. The metal centers of the promoters used in this invention are capable of existing in oxidation states ranging from (II) to (VI) at well-defined potential ranges. They also have the ability to bind and oxidize the poisoning species thus releasing the active platinum sites. This contrasts the ill-defined and irreversible redox chemistry of oxide species of metals such as ruthenium, molybdenum, etc.

SUMMARY OF THE INVENTION

This invention discloses a fuel cell in which higher current densities are achieved in a methanol anode that uses platinum electrocatalysts, by incorporating in the electrodes certain redox promoters.

The redox promoters include various metal complexes derived from a variety of organic ligands that a) are directly chemisorbed from their solution on high area carbons used for electrodes or directly chemisorbed on platinized high area carbons, or b) are covalently attached using a coupling agent to the carbon surface —OH groups.

The platinum can be included into these compositions in two ways. One method involves depositing Pt as a high area powder using acidic $H_2O_2$ and Pt sulfite acid from prior art, in the presence of promoter chemisorbed carbon. Another method involves mixing a constant composition of platinum (20% platinum on carbon or Pt black) directly with a known weight of the promoter solution, thoroughly mixing by sonication and drying the mixture before electrode fabrication. The second method ensures a constant platinum/promoter ratio whereas by the first method, the platinized platinum amounts could vary.

The promoter/platinum compositions once obtained could be fabricated into polytetrafluoroethylene (PTFE) bonded gas diffusion electrodes, known from prior art, for their performance study.

The performance of the promoted electrodes are initially screened by measuring the polarization (the electrode potential vs. RHE (reversible hydrogen electrode) of the electrode at various applied current densities. The E (potential) vs. log i (i=current density) are compared to the behavior of unpromoted electrodes under the same conditions.

The best promoted electrodes based on their polarization behavior in half cells compared to controls are then assembled in these sandwich-type membrane electrode assemblies (MEAs), known from prior art, where the separating membrane is an ionically conducting polymer such as a Nation (Dupont™) film. The full cell is tested with methanol as the anode feed and oxygen or air as the cathode feed in a conventional fuel cell.

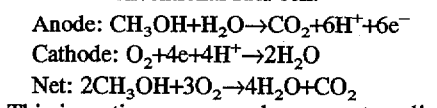

This invention uses as redox promoters, ligands, and their combinations with metals such as ruthenium, osmium, iridium, tin, molybdenum, manganese, rhodium, rhenium, and iron.

The ruthenium promoters typically show reversible electrochemistry in the potential region where methanol undergoes oxidation on platinum 0 V to 1.0 V vs. NHE.

The affinity of ruthenium species toward CO or $CO_2$ may be responsible for the poison removal phenomena; it could occur by the removal of CO-like poisons from platinum-active sites and/or the metal centers providing water, hydroxo or oxo groups to facilitate their further oxidation.

The present invention discloses the use of:

1) Directly chemisorbed mono or multimetallic complexes of metals from group VIIIA and group VIIA of the periodic table (IUPAC version) on platinized high area carbon.

2) Covalently linked metallocomplexes that contain —$NH_2$, NH or OH groups directly to a high area surface preferably carbon, followed by platinization to the desired extent.

3) Chemisorbed complexes as in 1, followed by platinization to the desired extent.

Gas diffusion electrodes fabricated using the above three types of materials, conforming to known designs for solid polymer electrolyte fuel cells show superior performance over controls with platinum alone.

The present invention provides an anode that is resistant to poisoning species when methanol or methanol reformate is oxidized using a platinum catalyst. It has been discovered that at low Pt loadings (20% w/w Pt on carbon) the presence of( 10% w/w) certain redox promoters enhance the performance of the electrode on par to 100% noble metal blacks, such as Pt black or Pt ruthenium black.

The ruthenium content in the promoted carbons from the present invention is less than 4%.

These and other features and objects of the present invention will be more fully understood from the following detailed description which should be read in connection with the drawings identified below.

BRIEF DESCRIPTION OF THE DRAWINGS

FIG. 5 is an exploded view of an electrode holder used in the cell shown in FIG. 4a.

DETAILED DESCRIPTION OF THE INVENTION

According to the present invention a fuel cell electrode is provided which makes use of a class of 'redox promoters' that enhance the activity of noble metal catalysts such as platinum during the electroxidation of methanol or methanol reformate. The redox promoters a) are characterized by well defined oxidation states at a given potential that have affinity for CO like species and/or oxygen; b) are coordinated to water, hydroxo or oxo groups that can catalytically oxidize poisoning impurities; and c) that are electrochemically reversible.

Figure 1A:
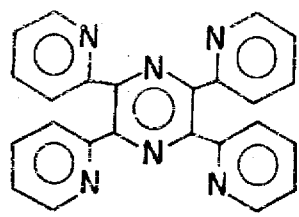
FIGS. 1a–1l are representations of structures of ligands used to synthesize redox promoters incorporated in an electrode of the present invention.
Figure 1B:
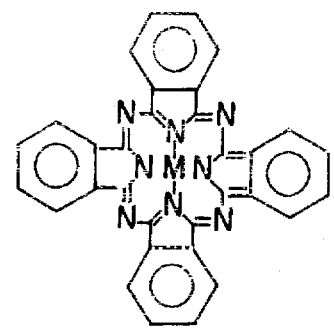
Figure 1C:
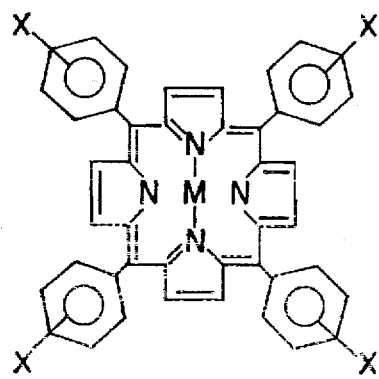
Figure 1D:
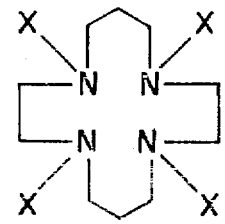
Figure 1E:
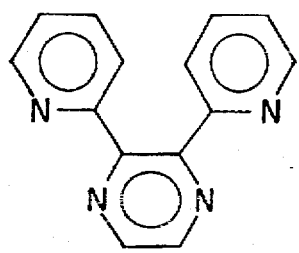
Figure 1F:
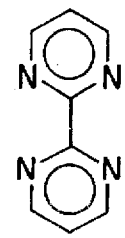
Figure 1G:
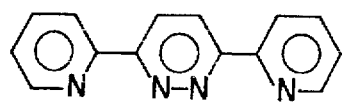
Figure 1H:
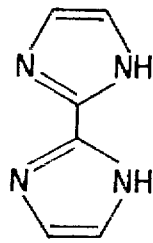
Figure 1I:
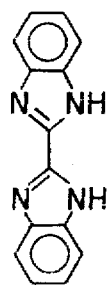
Figure 1J:
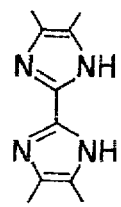
Figure 1K:
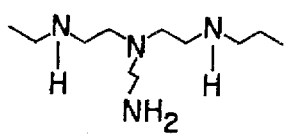
Figure 1L:
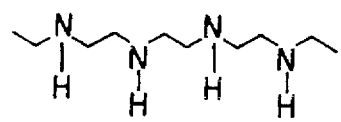

The redox promoters utilized in the present invention belong to ruthenium or tin complexes of macrocyclic ligands such as pyrazine (FIG. 1a), phthalocyanines (FIG. 1b), porphyrins (FIG. 1c), and cyclam types (FIG. 1d), as well as heterocyclic ligands derived from pyrazine (FIG. 1e), pyrimidine (FIG. 1f), pyridazine (FIG. 1g), and imidazoles (FIGS. 1h, 1i, & 1j) and polymeric imines such as polyethyleneimine (FIG. 1k (branched) and FIG. 1l (linear)).

Ligands such as bipyrimidine (FIG. 1f) are capable of binding two metals and can form bridges between two metals coordinated to other ligands. These complexes have been synthesized. The biimidazole and bibenzimidazole (FIGS. 1h & 1i) have been also synthesized as bridge systems.

One of the objects of the invention is to use some of the ligand systems to construct $ML_1$, $M(L_1)_2$, $ML_2L_1$, or $M_2(L_3)_2$ complexes (where M stands for Ru, Sn, Ir, Os, Mo, Mn, Rh, Pt, Co or Fe) that will have open coordination at the axial sites, where $L_1$ refers to a ligand system that can form an —$N_4$ coordination around the metal centers, $L_2$ to simple coordinating species such as $Cl^-$, $H_2O$, etc., and $L_3$ to ligand systems such as DPPN (FIG. 1g) which are capable of forming binuclear complexes.

The syntheses of the metal complexes derived from the ligands from FIG. 1 are described in detail in Example 1. Ligands, such as tetrapyridyl pyrazine (FIG. 1a), porphyrins (FIG. 1b), phthalocyanines (FIG. 1c), cyclam types (FIG. 1d), dipyridyl pyrazine (FIG. 1e) and pyrimidines (FIG. 1f), and dimethyl biimidazoles (FIG. 1j) and polyethyleneimine (FIG. 1k), can be purchased from commercial sources indicated in Example 1. The other ligands can be synthesized using published procedures.

The principles of the covalent attachment scheme is shown in FIG. 2. This coupling of —$NH_2$ to —OH groups on surfaces is achieved by the use of cyanuric chloride as the coupling agent. The —$NH_2$ or —NH groups on the ligands could be thus anchored onto high area carbon surfaces. Tetraminophenylporphyrins containing Ru or Sn were anchored to carbon surfaces. The water soluble ligand cyclam could be successfully attached to carbon and complexed with ruthenium in a second step.

The Example 3 describes the redox behavior of some of the promoters. The Ru(III)/(II) couples are reversible and occur at different potentials for different ligand environments, in the range of +0.0V and +0.6V vs. SCE. At higher potentials around 1.0V, futher oxidation to Ru(IV) and Ru(VI) species occurs in some cases.

A method of making promoter modified carbons by chemisorption is described in detail in Example 4. The promoter complexes are dissolved in suitable solvents with quantities representing 10% w/w to the carbon. After this step the promoter modified carbons are platinized using prior art. This method results in different degrees of platinization. Such platinization can also be carried out on promoters bound to carbon by covalent attachment.

In order to maintain a constant platinum, another method where the redox promoters are directly chemisorbed onto platinized carbon (where Pt content is fixed), directly is described in Example 5.

The preparation of porous gas diffusion electrodes for testing in fuel cells is based on known designs. Such gas diffusion electrodes are described by, for example, Watanabe et al., *J. Electroanal. Chem.*, *183*, 391–394 (1985). These electrodes are produced by sintering carbon black together with carbon black particles covered with the catalyst, polytetrafluoroethylene on a suitable conductor, for instance carbon paper. The resulting electrode consists of a porous network in which the catalyst particles are in contact with one another, forming a percolation network. A percolation network has permanent connection between the catalyst particles.

Figure 4:
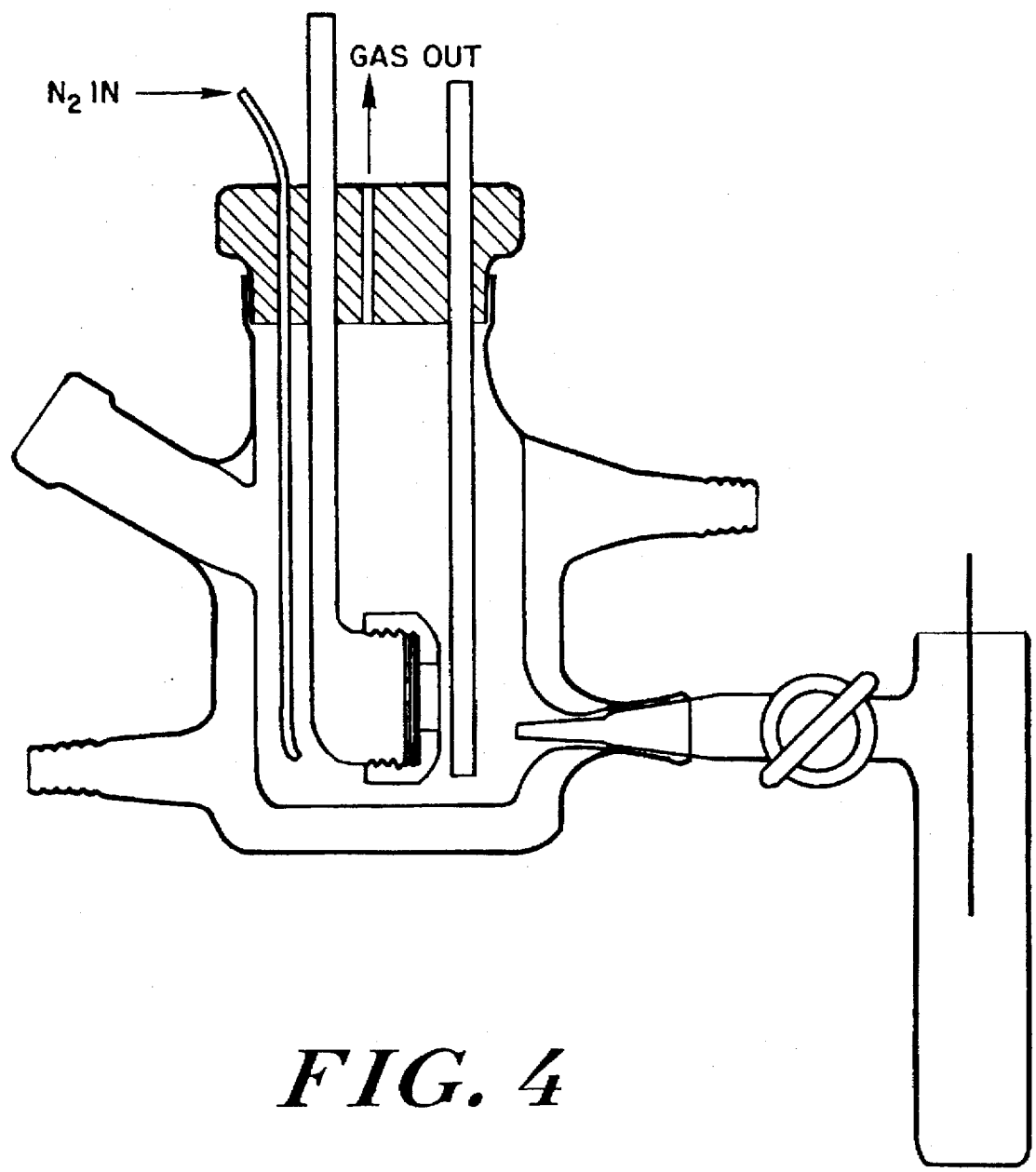
FIG. 4 is a sectional view of an experimental cell used for half cell polarization studies.
Figure 5:
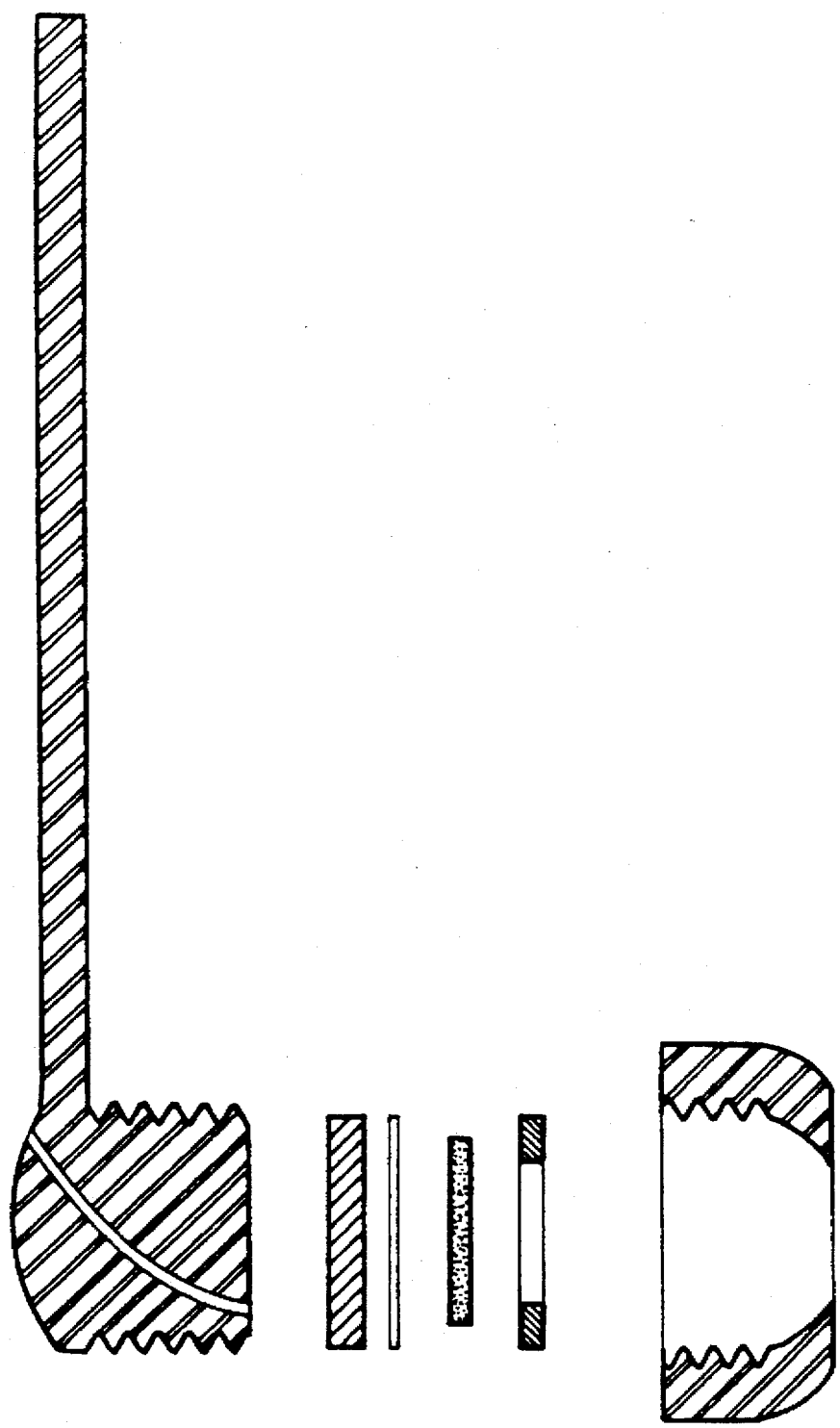

Such electrodes prepared from Examples 4 and 5 were tested in a methanol half cell setup shown in FIG. 4, and FIG. 5 shows the electrode holder structure.

The ruthenium complexes in different ligand environments, when present as promoters along with platinum, show improvements to varying degrees when methanol is oxidized at a half cell and galvanostatic polarizations are carried out. Such differences are attributed to the electronic effects of the ligand. One striking discovery was that when tin and ruthenium are bound to certain ligands or when tin or ruthenium are bound to polyethyleneimine performances excelling that of the state of Ru—Pt black were observed. The details are described in Example 6.

The full cell tests were carried out in a conventional fuel cell structure, conforming to known designs for solid polymer electrolyte (SPE) fuel cells having gas diffusion type anodes and cathodes capable of providing a three-way interface/gas/electrocatalyst/SPE for the oxidation of fuel at the anode and oxygen to water at the cathode. At the anode the alcohol is fed in a liquid such as water and a gas diffusion type structure can accommodate a liquid fell. In this invention it is generally preferred that alcohol be in the liquid mode for methanol and gaseous methanol reformate for methanol reformate oxidation. The results of full cell tests are discussed under Example 7.

The gas diffusion electrode is in contact with solid polymer acidic electrolytes such as sulfonated fluorinated polymer membrane-like materials under trademark Nation by E. I. DuPont de Nemours and Co. of Wilmington, Del., USA. Such membrane-like materials have a fluorinated olefin homopolymer or copolymer "backbone" and pendent partially or fully fluorinated hydrocarbon or ether chains or groups terminated with acidic groups, preferably —$SO_3H$, but phosphonic or boric acid type groups are known from the patent literature.

The anode for fuel cell from this invention can therefore be used in a conventional fuel cell.

The fully assembled fuel cell can have stack designs. Any conventional way of producing a steady stream of fuel or oxygen to the cathode can be used. Electrode to the anode leads and extended circuitry are conventional.

By fine-tuning such promoters in terms of the producing of an active redox state at potentials where methanol oxidation occurs, the poisoning effect is overcome.

The same redox promoters that clean platinum during methanol oxidation could be used for anodes that use $H_2$ contaminated by small amounts of $CO_2$. This is quite common in hydrogen-oxygen fuel cells that use methanol reformate at the anode ($H_2$, CO, $CO_2$ and trace organics). The platinum catalyst under these conditions become poisoned. By producing an electrode cell in accordance with the teachings of this invention the $CO_2$ tolerance of platinum in the presence of redox promoters is considerably improved, especially at high current densities.

EXAMPLE 1

The ruthenium complex of ligand 1a is synthesized as follows: The ligand 2,3,5,6 tetrakis (2'-pyridyl) pyrazine (TPPZ, GFS chemicals, USA) (3 mmoles) 1.165 g is dissolved in ethanol (95%) and $RuCL_3.3H_2O$ (Johnson Matthey) (3 mmoles) 0.783 g in 95% ethanol is slowly added under reflux with stirring. The mixture is refluxed under Argon for 24 h and the precipitate formed is filtered and washed with cold 95% ETOH five times and dried at 110° C.

The ligands shown in FIGS. 1b and 1c phthalocyanines and porphyrins and their metallocomplexes can be obtained by custom order from Mid-Century Chemicals, Posen, Ill., or Porphyrin Products, Utah.

The ligand cyclam or tetramethyl cyclam can be obtained from Aldrich Co. The preparation of the ruthenium complexes are described in the literature (Che et al., Inorg. Chem., 24, 1797–1800 (1985) and references therein).

The synthesis involves the addition of stoichiometric quantities of tetramethyl cyclam (TMC) or cyclam dissolved in absolute ethanol to a refluxing solution of $K_2RuCl_5H_2O$ (Strem Chemicals, R.I., USA). The metal ligand ratio is 1:1. The addition of the ligand to the metal solution is done dropwise over an extended period of over 6–8 h. The resulting solution is concentrated, and the solid filtered and recrystallized from 2MHCl.

The ligand shown in FIG. 1e is purchased from Aldrich Co. or Alfa.

Refluxing equimolar amounts of $RuCl_3.3H_2O$ (Alfa, USA) and the ligand 1e in 95% ethanol for 72 h gave a maroonish precipitate which can be recrystallized from 1:1 ethanol, water. A bimetallic complex could be prepared by reacting 2 equivalents of the metal with one equivalent of the ligand. A similar preparation and purification of a related complex is described by Braunstein et al., Inorg. Chem., 23 (1984).

The ligand FIG. 1f can be purchased from Alfa, USA. Typically the ligand 3 mmoles is dissolved in 95% ethanol and 3 millimoles of $RuCl_3.3H_2O$ (6 mmoles for the bimetallic complex) is added and stirred under reflux for about 16–18 h under argon. The precipitated complex is filtered and washed with a small amount of 95% ETOH and dried at 110° C.

The ligand FIG. 1g is prepared according to literature (Butte and Case, J. Org. Chem., 26, 4690 (1961). $Ru_2(dppn)_2Cl_4$: The precursor of 1 g, 3,6-Bis(2'-pryidyl)-1,2,4,5-tetrazine was prepared as follows: A solution of 10.4 g. (0.1 mole (of 2-cyanopyridine and 13.4 g. (0.4 mole) of 95% hydrazine in 59 ml. of absolute ethanol was refluxed gently for 6 hr. The resulting orange precipitate was removed and recrystallized from ethanol providing 9.1 g. (76%) of the dihydro base, large yellow needles, m.p. 193°–194° C. (m.p. 194.2° C.). The dihydro base obtained above was dissolved in 50 ml. of warm glacial acetic acid, and 8.0 ml. of concentrated nitric acid was added dropwise and the mixture was made distinctly alkaline by the addition of sodium bicarbonate. The crystalline precipitate was separated and washed with ethanol to give 5.5 g. (64%) of 3,6-Bis(2'-pryidyl)-1,2,4,5-tetrazine, a deep red solid, m.p. 222° C. (m.p. 224.5° C.).

The ligand 3,6-Bis(2'-pyridyl)pyridazine(dppn) was prepared from the precursor as follows. Acetylene was slowly bubbled through refluxing dimethylformamide containing 1.0 g. of finely divided precursor tetrazine. The disappearance of the red color indicated the completion of the reaction. The solvent was recovered by distillation and the solid residue was recrystallized from absolute ethanol producing 0.79 g. (84%) of colorless needles, m.p. 179°–180° C.

The ligand dppn, (2 mmoles) was dissolved in DMF (50 ml), warmed, and an acetonitrile solution containing 2 mmoles of $RuCl_3. 3H_2O$ (100 ml) was added slowly while vigorously stirring. The resulting brown solution was refluxed while vigorously stirring for 10–12 hours. The reflux flask was covered with aluminum foil to avoid light. At the end of this period, a maroon purple microcrystalline deposit was obtained, which was insoluble in several common organic solvents. Absolute ethanol was used to wash the precipitate which was dried in an oven.

Ru-Biimidazole [Rillema et al., Inorg. Chem., 29(2), 167–173 (1990)]: Biimidazole was prepared as described by Fieselmann et al., full reference from recent Phase II (1978). Biimidazole (0.2 g; 1.5 mmol) was added to 30 ml of a 2:1 ethanol/water mixture in a 3 neck flask fitted with a gas inlet tube and a reflux condenser. Ruthenium chloride (0.38 g; 1.5 mmol) was dissolved in 15 ml 2:1 ethanol/water and added to the biimidazole suspension. The mixture was refluxed overnight to give a blue-purple solution, then cooled to room temperature and filtered. The solvent was evaporated on a hot plate until only a few ml remained and filtered to give 0.36 g of solid. Yield 80%.

Ru$_2$-Biimidazole: Biimidazole (2 mmol) was dissolved in dry ethanol containing Li isopropoxide (1 mmol), to deprotonate the protons on the ligand. RuCl$_3$ (4 mmol) was added to the deaerated refluxing ligand and the mixture refluxed overnight under argon. On concentration, a solid separated out that was filtered, washed with water and dried.

EXAMPLE 2

The redox behavior of some promoters obtained by cyclic voltammetry are shown in FIGS. 2a–2f.

Figure 2A:
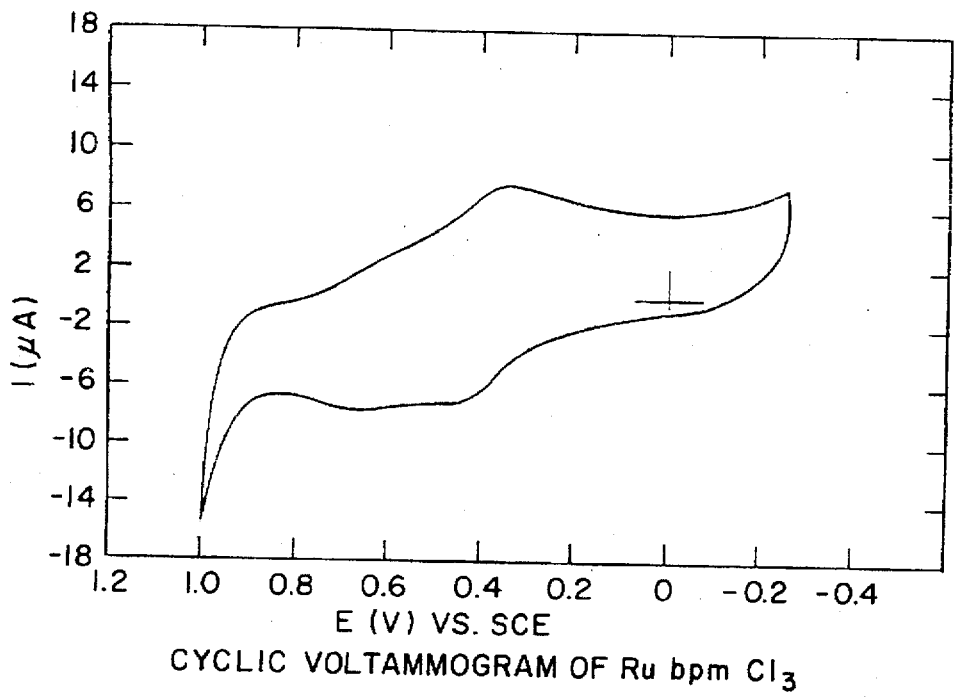
FIGS. 2a–2f are graphs showing redox characteristics of selected promoters.
Figure 2B:
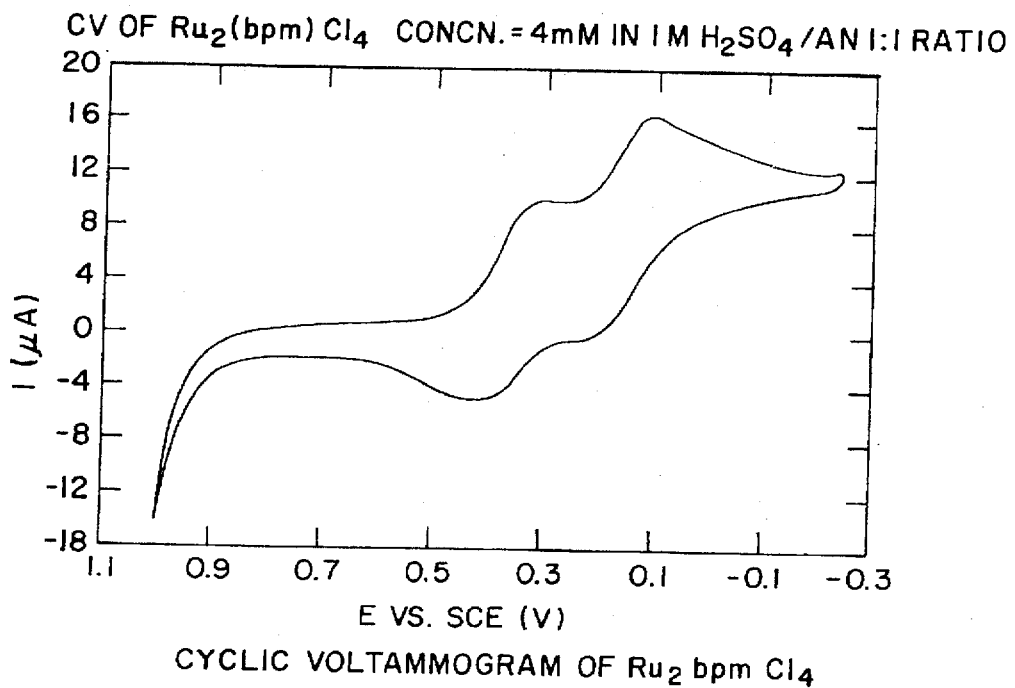

The Ru$_2$bpmCl$_4$ shows two redox couples approximately around 0.2V and 0.4V(FIG. 2a). The mononuclear complex shows a redox couple around 0.4V (FIG. 2b).

Figure 2C:
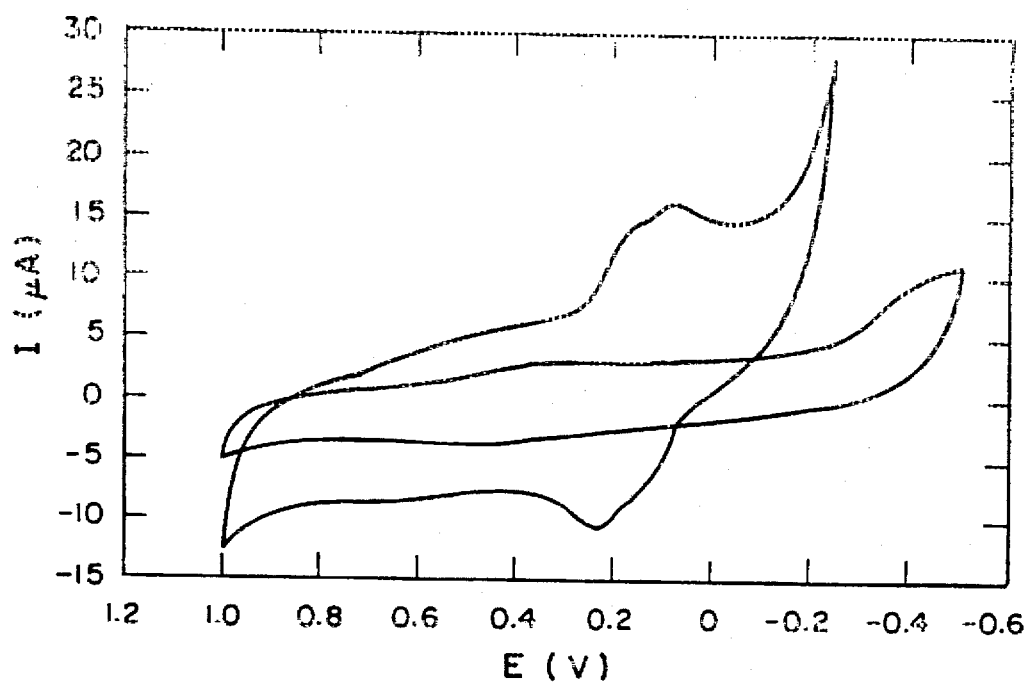
Figure 2D:
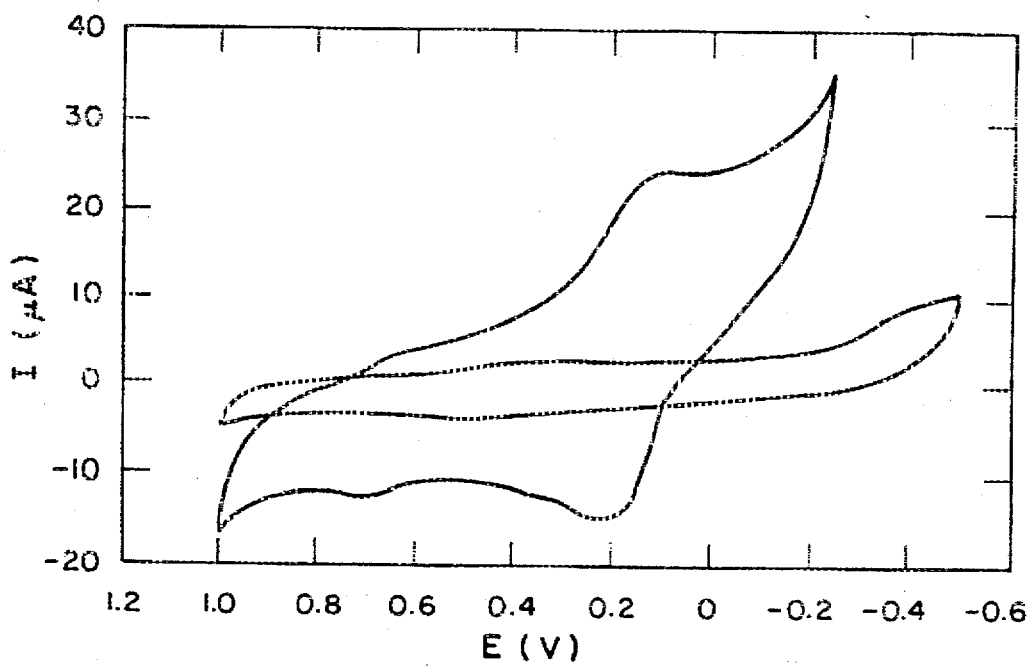

The ruthenium biimidazole complexes show redox couples around +0.2V (FIG. 2c). The binuclear species show a two step wave indicating two metal centers (FIG. 2d).

Figure 2E:
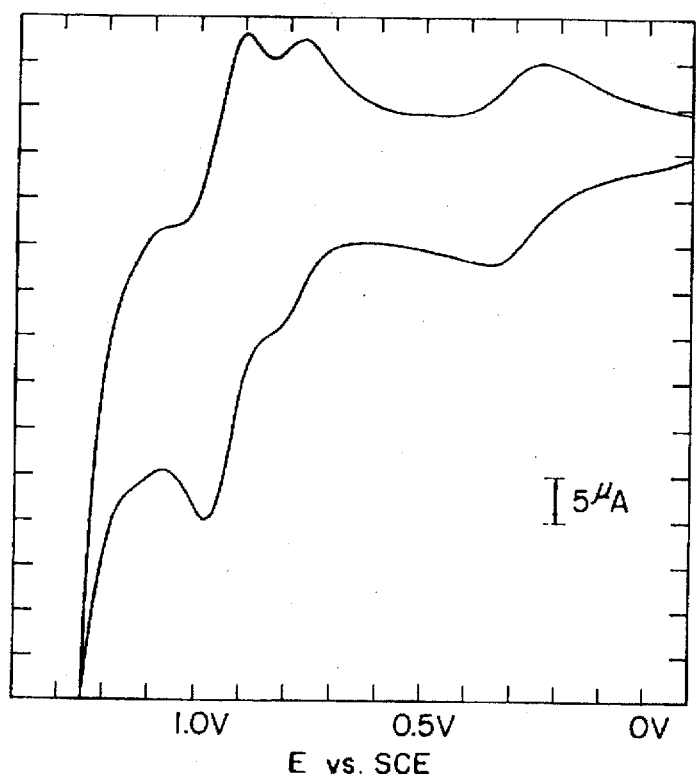

The redox behavior of Ru$_2$(dppn)$_2$Cl$_4$ is shown in FIG. 2e and its electrochemical oxidation states are indicated in the same figure.

Figure 2F:
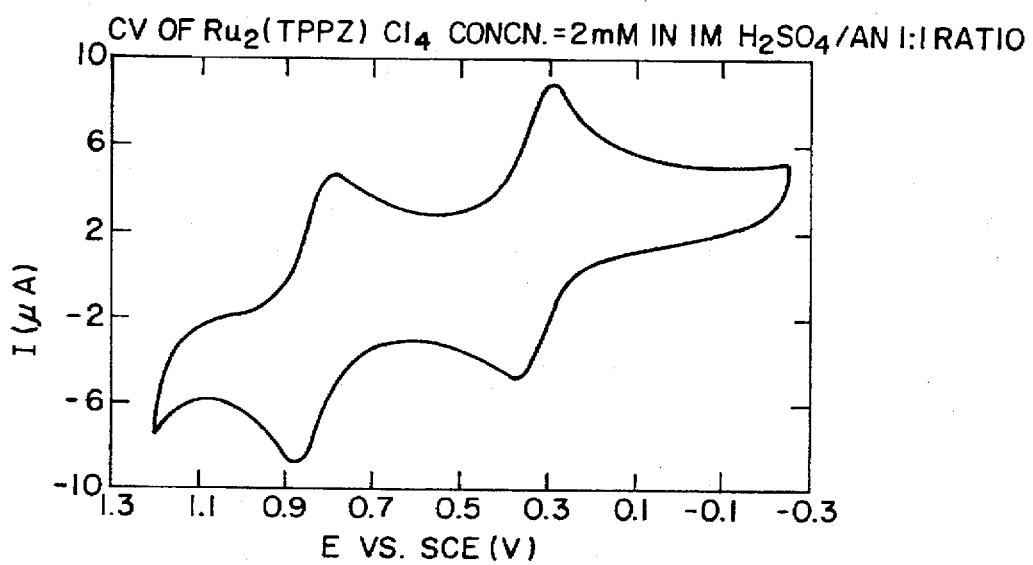
Figure 3:
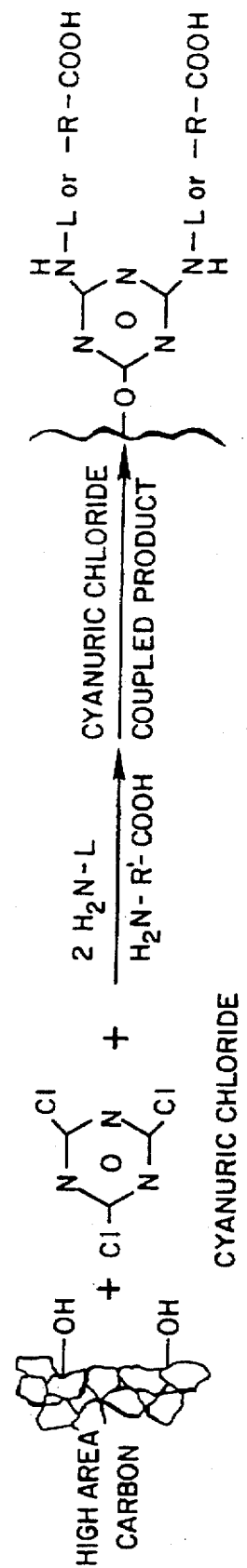
FIG. 3 is a representation of a covalent attachment scheme.

The cyclic voltammogram of Ru$_2$TPPZ species is shown in FIG. 2f. The two redox couples around +0.3V and +0.9V are due to the two ruthenium.

EXAMPLE 3

This example describes the attachment of —OH, NH$_2$, —NH-bearing ligands to —OH groups of carbon surface on the carbon that is used for electrode fabrication using cyanuric chloride as the coupling agent.
Covalent binding of complexes About 2–4% of cyanuric chloride (Sigma Co.) in dry acetone was equilibrated as a slurry with a known weight of dry Vulcan XC-72 distributed under the trade name (oxidized) (Cabot Co., Billerica, Mass.) or M-1300 (Cabot Co.) and allowed to react overnight at 4° C. with stirring.

The resulting slurry was filtered the next day, washed with dry acetone to remove excess cyanuric chloride. The filtered carbon was then allowed to react with the following solutions. Cyclam in NaHCO$_3$/NaOH pH~8, tin or ruthenium tetramino phenyl porphyrin slurry in NaHCO$_3$ at pH=8. The mixtures were heated up to 80° C. to enable full coupling (FIG. 2) for about 6–8 hours with vigorous stirring. The solid is then filtered, washed several times with warm acetone, and dried.

The analysis of the surface modified carbons showed increase nitrogen contents and the infrared spectra showed the signals for the respective ligands.

EXAMPLE 4

This example describes the preparation of promoter modified carbons by simple chemisorption, followed by platinization.
Fabrication of the promoter core For compounds that were soluble in methylene chloride or methanol or dilute sulfuric acid, the following procedure was adopted. The quantities of promoters used are around at 10% w/w with respect to the carbon.

Dissolved 250mg each in separate solutions of ruthenium octaethyl porphyrin (OEP), tin octaethyl porphyrin, ruthenium tetraphenyl porphyrin (TPP), ruthenium or tin (VI) tetramino phenyl porphyrin (TAPP), ruthenium or tin tetramethoxy phenyl porphyrin (TMPP) in 30 mL of methylene chloride or methanol. After sonication, the solutions were mixed each with 2.5 g of Vulcan XC-72 carbon. The slurries were sonicated for a standardized period of time.

Complex Ru$_2$ (dppn)$_2$ Cl$_4$ was soluble only in 2M H$_2$SO$_4$ and 2.5 g of the carbon was mixed and sonicated. Since most of the complex adsorbed very strongly on high area carbon, the acid could be washed off with a dilute solution of NaHCO$_3$ (1M) followed by DI water.

The resulting carbons were allowed to equilibrate under stirring for about 2 hours and filtered. The carbons were washed with water and dried 110° C. A loading of 10% w/w complex on carbon was aimed at.

This was prepared by adding 0.3 g of PEI polyethylene imine polysciences MW 1800 in water to 1.7 g of 20%Pt/C followed by the addition of 0.3 g RuCl$_3$.3H$_2$O. Heated to boiling and evaporated the solvent to obtain semi-dry solid, which is further dried in an oven at 110° C.

Platinization of promoter modified carbons: The Prototech method which is described in Petrow and Allen, U.S. Pat. No. 4,004,193 was adopted. This procedure refers to the deposition of a controlled amount of platinum black on carbon. Prepared 200 mL of platinum acid sulfite is mixed (Strem Chemical Company) in water to give a platinum metal concentration of 2.5 g/L. The solution was divided into 20 mL batches to which 0.45 g of each of the chemically modified carbons and the unmodified controls is added.

The slurry was stirred and sonicated. To the well dispersed slurry 1 mL of 30% H$_2$O$_2$ (without stabilizer) was added dropwise slowly as described in U.S. Pat. No. 4,004,193. The resulting solution was heated to boiling while stirring for one hour.

The platinized carbon was filtered, washed with distilled water and dried in an oven at 110° C. followed by vacuum drying. The quantities used represent an aim to load 10 wt. % platinum. The same procedure for platinization was used for surface modified carbons from Example 3. The amounts of Pt from this platinization procedure varied from 4–9% for various promoted carbons.

EXAMPLE 5

This example describes the preparation of mixtures of 20% Pt on carbon or Pt black with 10% promoter w/w.

Solutions of macrocycles in methylene chloride or acetonitrile were mixed with 20% Pt on carbon. Typically 0.1 g of the promoter complex is dissolved in methylene chloride or acetonitrile and mixed with 20% Pt on carbon (Johnson-Matthey Co.) (0.9 g) and sonicated. The methylene chloride is slowly evaporated and the carbon vacuum dried (Table II). (Note: Complexes soluble in methanol or any oxidizable organic solvent cannot be exposed to 20% platinized carbon as platinum tends to react violently!) Pre-wetting the platinum/C or Pt black with water and using 50:50 alcohol-water mixture is recommended.

TABLE I

|  | % Pt | % Ru | % Sn |
|---|---|---|---|
| C/Ru.(TPPZ)/Pt | 18 | 1.8 |  |
| C/Ru bpm/Pt | 18 | 3.06 |  |
| C/Ru$_2$(bpm)/Pt | 18 | 4.02 |  |

TABLE I-continued

| | % Pt | % Ru | % Sn |
|---|---|---|---|
| Pt on Vulcan XC-72R (Johnson/Matthey) | 20 | | |
| C/SnOEP/Pt | 18 | | 1.82 |
| Pt/Ru/Vulcan XC (Johnson/Matthey) | 12 | 8.0 | |
| Pt Black (Engelhardt)/ RubpmCl$_2$ | 85 | 3.0 | |
| Pt Black (Engelhardt) | 100 | | |
| RuTAPP/C/Pt | 18 | 1.5 | |
| Rubiimidazole/C/Pt | 18 | 3.3 | |

This table shows the amounts of platinum and promoted metal contents in the mixtures used for the electrodes. Since the amount of platinum that is used to make the mixture is well defined, the percentage of platinum in the mixture can be calculated easily. The promoter metal content is calculated from the formula weight of the complex and its weight percentage in the mixture.

EXAMPLE 6

Fabrication of electrodes and half cell tests in liquid methanol

Preparation of Gas Diffusion Electrode

The catalyst (200 mg) is weighed into a 100 ml beaker and wetted with approx. 50 ml of distilled water. The mixture is stirred with a magnetic stirrer for 10 minutes and subsequently sonicated with 40 watts of power for 3 minutes to obtain a uniform wetted slurry. The pH of this suspension is then measured and adjusted to 3, with a dilute solution of sulfuric acid or NaOH. 67 mg (properly adjusted for the solids content) of Teflon T-30 suspension is added to the pH adjusted catalyst slurry while stirring with a magnetic stirrer. The addition is carried out slowly to allow proper and uniform mixing. The catalyst-Teflon suspension is then sonicated with 40 watts of power for 3 minutes to initiate the flocculation process. At the end of sonication, the suspension is set aside.

The flocculated slurry is now filtered through a Millipore filtration setup (available from Millipore Corporation, MA) with fluoropore 5 micron membranes. To make electrodes, the slurry is filtered through this set up onto a microporous Teflon sheet or to the carbon paper itself. The filtered slurry is washed several times to remove acid and surfactants. The filter cake is then transferred to a carbon paper support. The filtered cake is then pressed at 100 psi first at room temperature for 10 minutes, then at 110° C. for another 10 minutes.

The baking and sintering of the electrode are carried out in a furnace equipped with inert atmosphere. The electrode is placed in a furnace pre-heated to 270° C., and baked for 20 minutes; the temperature is then raised to 340° C. and the electrode is maintained another 20 minutes at that temperature.

Polarization Studies with liquid phase methanol: The apparatus shown in FIGS. 4 and 5 was used for this study. The IR drop was measured using PAR potentiostat on several different occasions with a fixed cell configuration. Several measurements, over a time period gave values around 0.5 kohm, the average of which was 0.5 ohm. All data have been corrected for IR assuming this average value of 0.5 ohm.

This example describes the effect of various promoters on the platinum catalyst. Ligand effects and metal effects are discussed.

The half cell polarization data obtained in liquid phase methanol is shown in FIGS. 6a–6g.

Figure 6A:
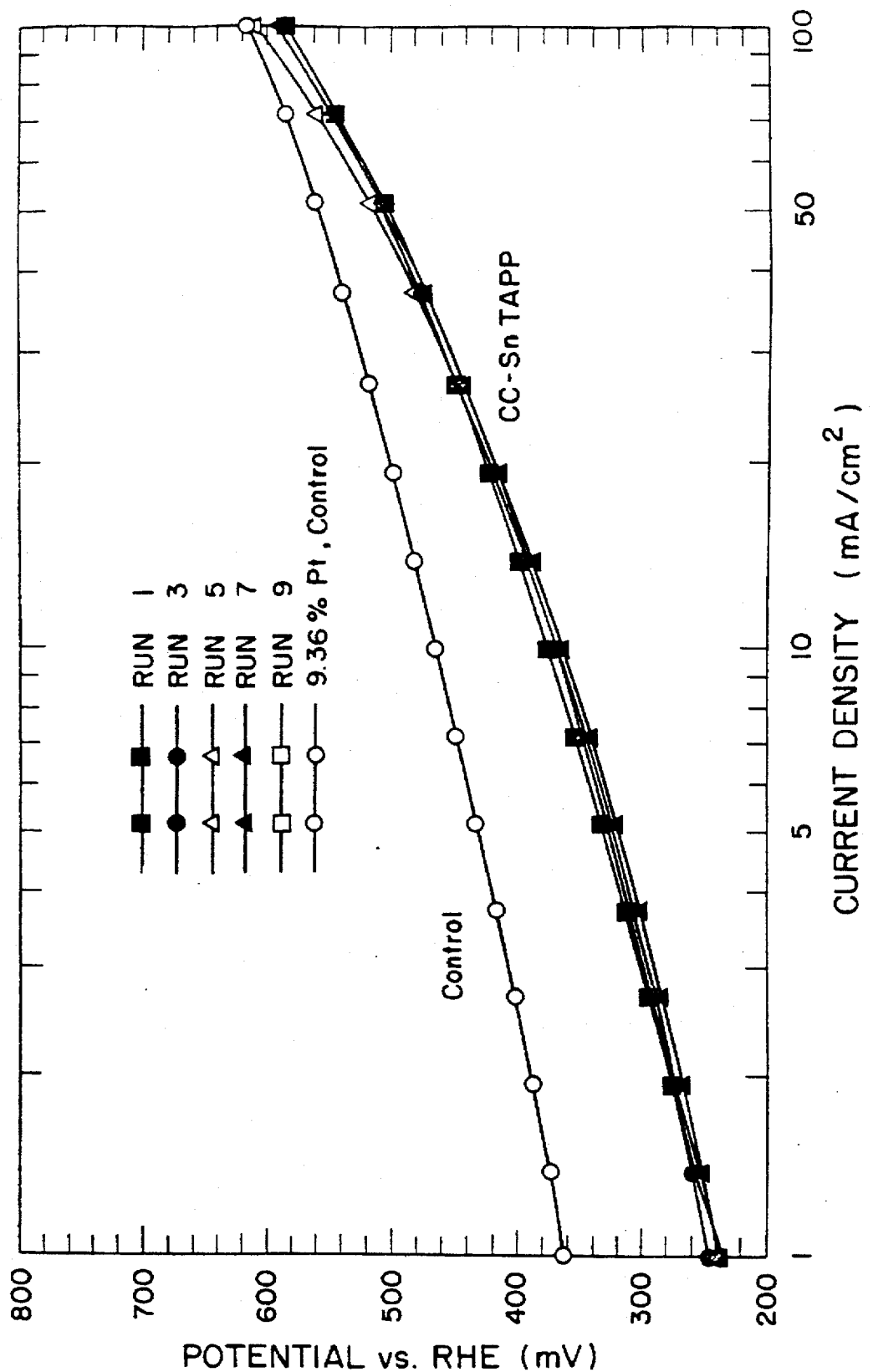
FIGS. 6c–6h are graphs showing the results of half-cell polarization studies on electrodes constructed in accordance with the present invention.
Figure 6B:
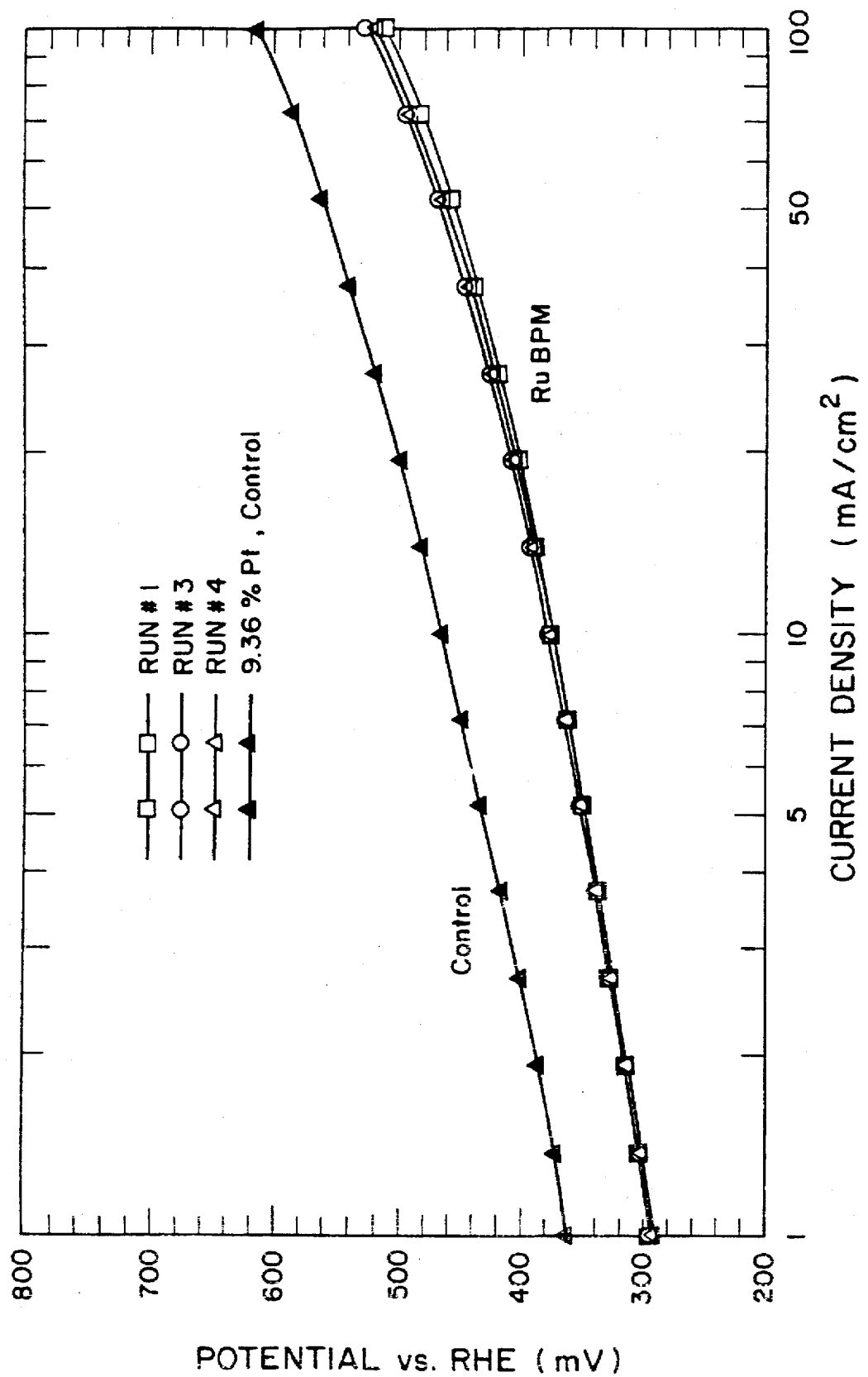

The FIG. 6a uses electrodes from Example 4 where tetaminophenyl tin porphyrin was covalently bound to carbon and platinized. The Pt content was found to be 6.78 and the control carbon had a Pt content of 9.36. In spite of the lower Pt content in the former, the polarization behavior shows a remarkable improvement over the control. Similarly in FIG. 6b, compares the behavior of Rubpm chemisorbed carbon after platinization (Pt content) 5.86 vs. Pt control.

Figure 6C:
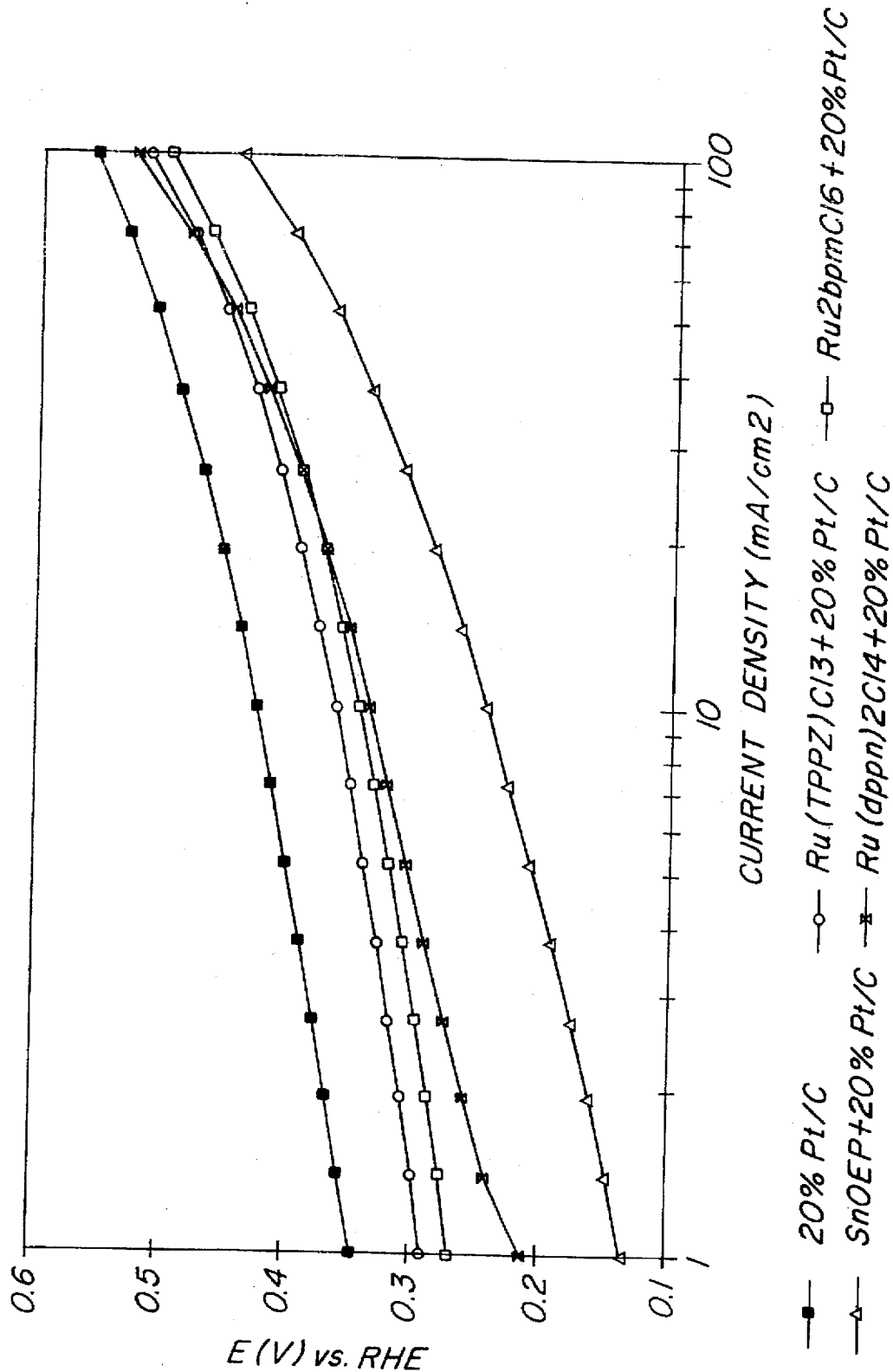
Figure 6D:
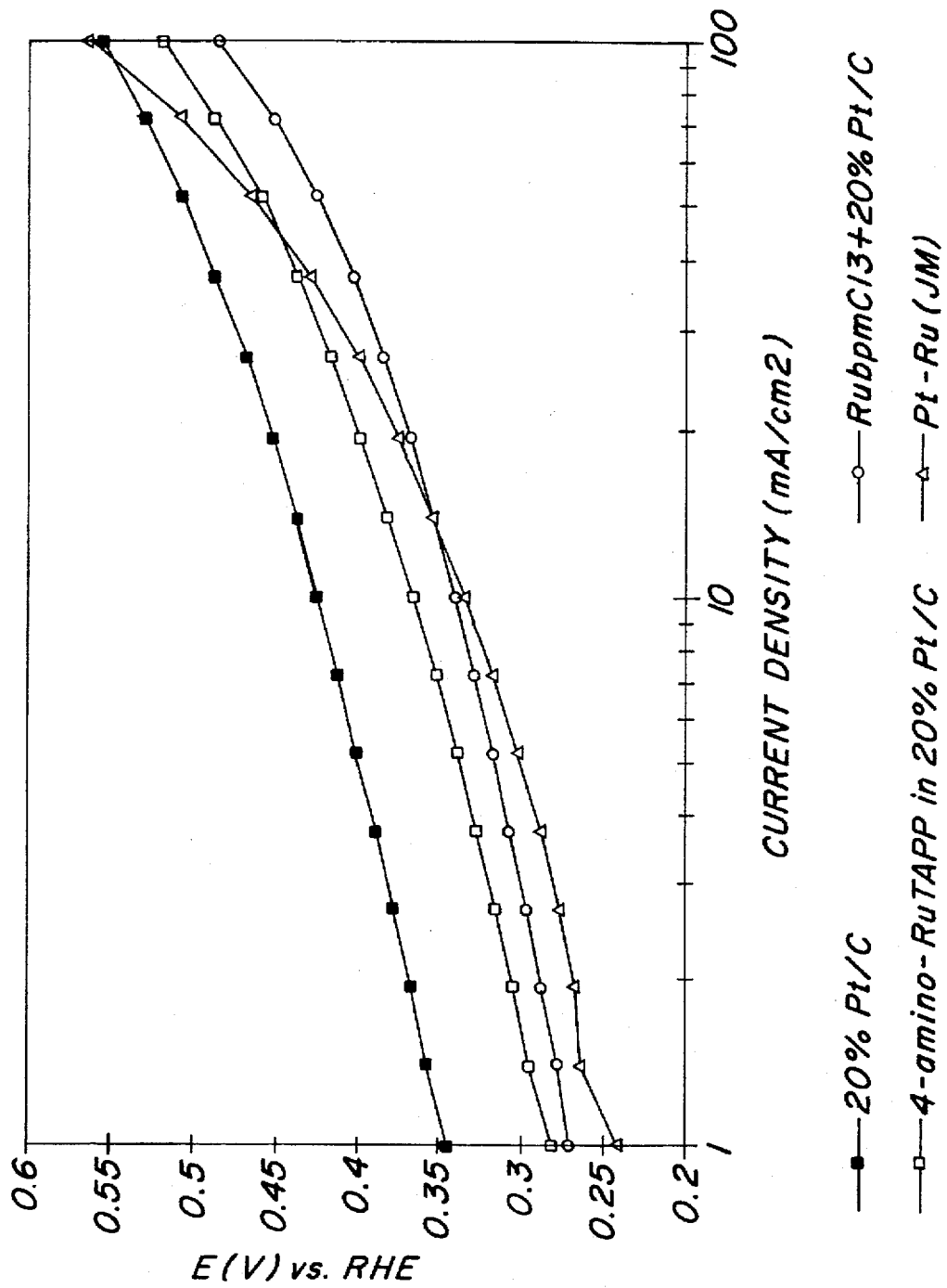

The behavior of promoted carbons with fixed amounts of Pt (from Example 5) are shown in FIG. 6c. The effect of various ligand environments are shown (FIG. 6d).

Figure 6E:
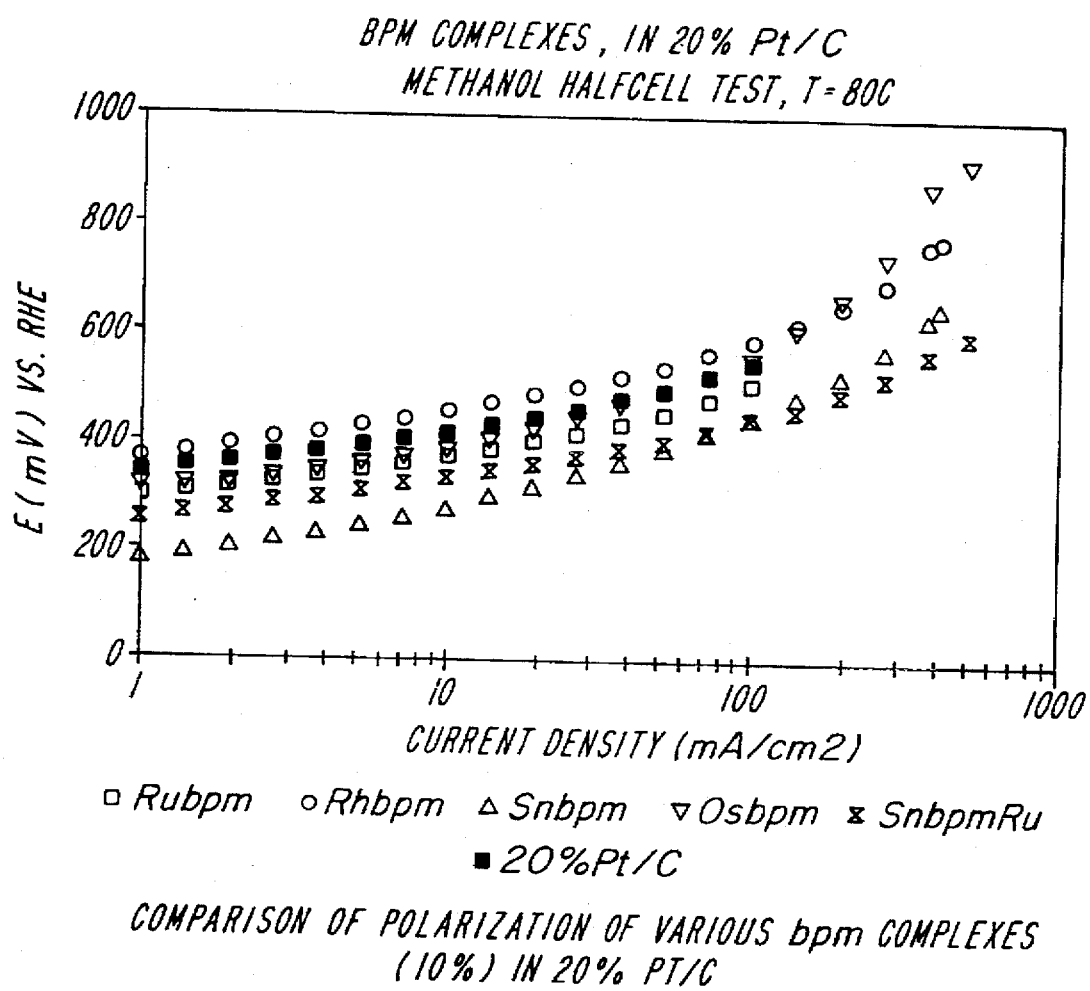
Figure 6F:
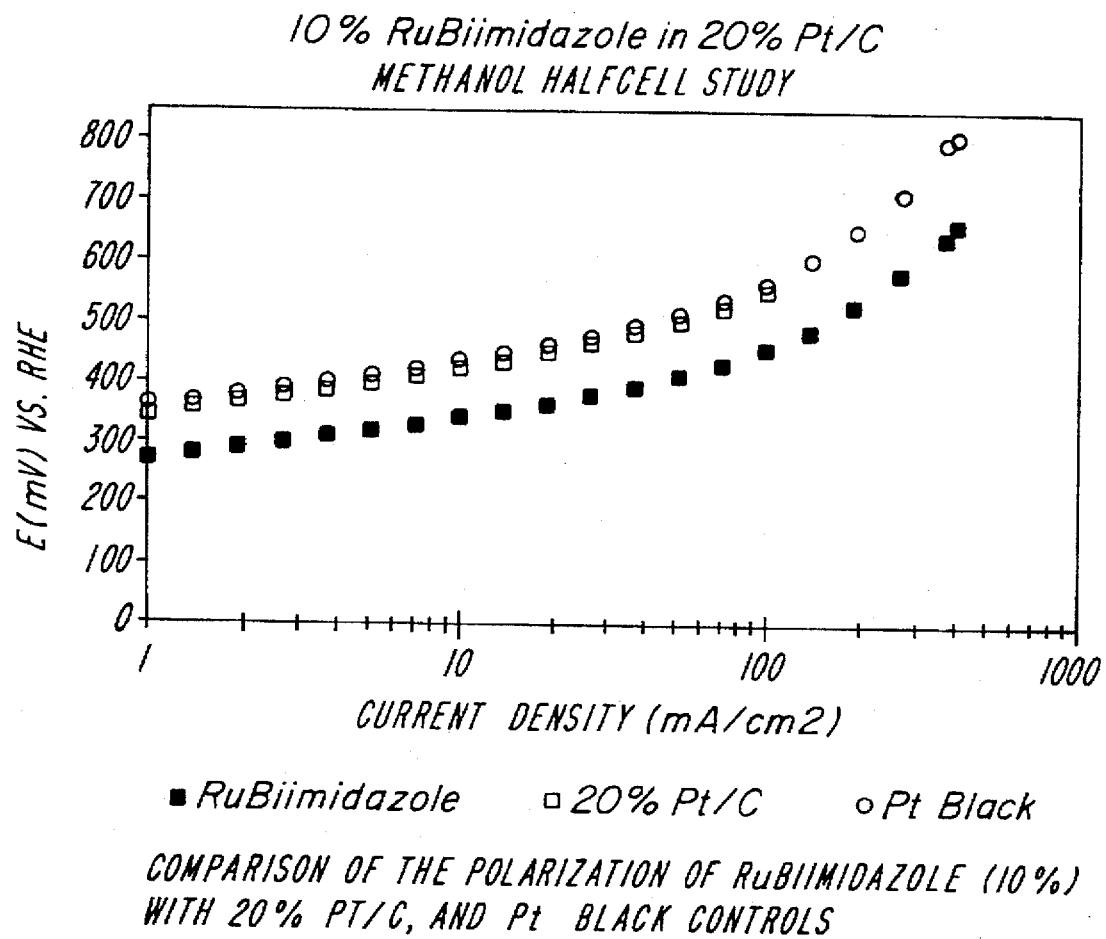
Figure 6G:
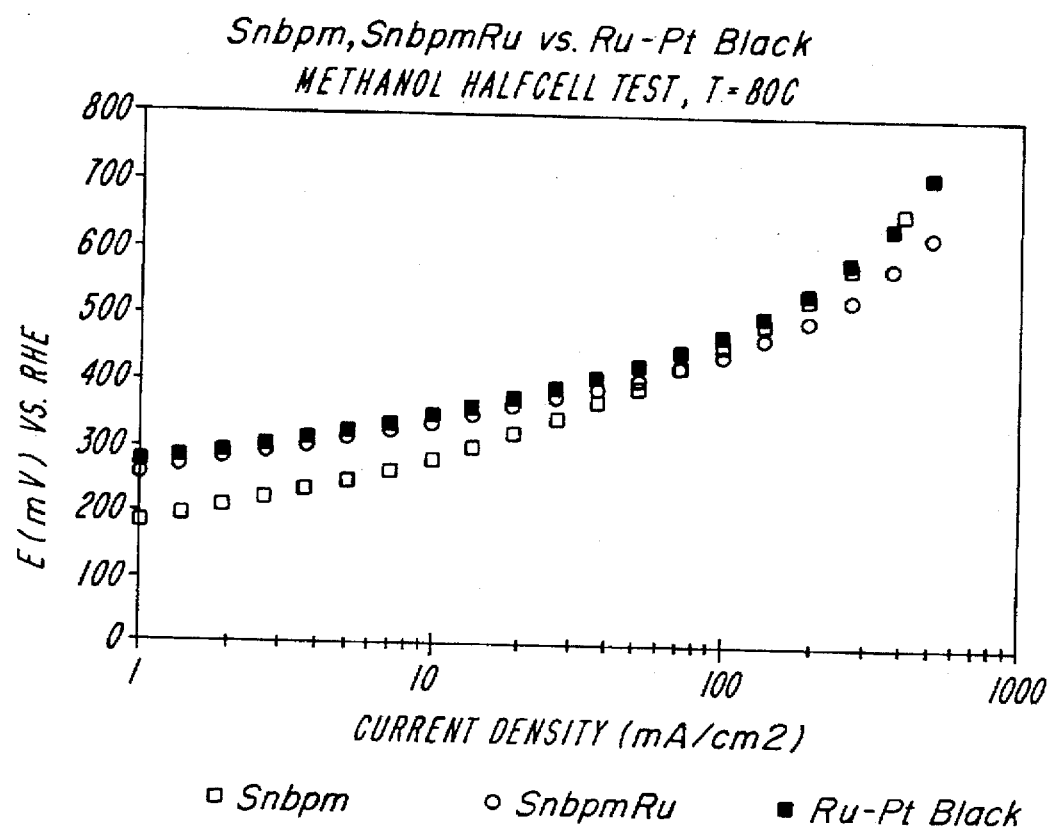
Figure 6H:
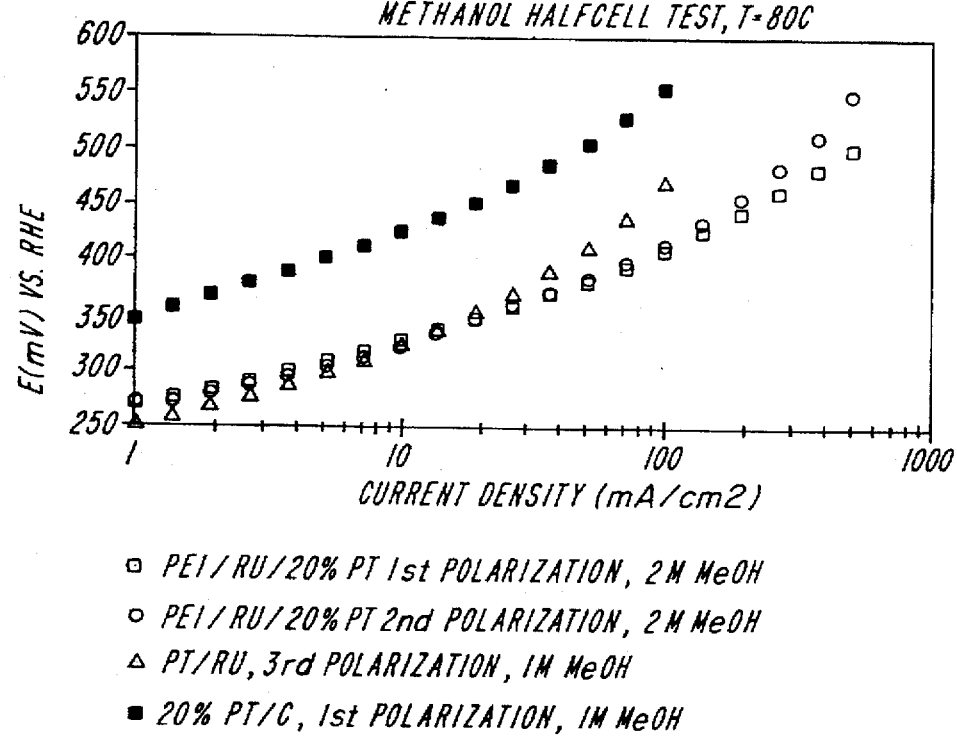

The effect of various metals in combination with the bipyrimidine ligand on the oxidation of methanol is shown in FIG. 6e. It is interesting to note that Snbpm and Rubpm show about the same improvement in polarization. The ligand biimidazole in combination with Ru showed the best performance also (FIG. 6f). It is thus found that 20% Pt/C combined with suitable promoters could match or exceed the performance of pure 100% Ru/Pt blacks. It is noteworthy that tin and ruthenium bridged by bpm ligand appears more effective (FIG. 6g). The polyethyleneimine-Ru promoted electrode also shows performance on par with ruthenium-Pt black (FIG. 6h).

EXAMPLE 7

Electrodes were fabricated using standard procedures for Teflon bonded electrodes.

The catalyst carbon powder is teflonated with TFE-30 (25 w%) by mixing Teflon suspension dispersed in a mixture of isopropyl alcohol and water approximately 50/50. The mixture is ultrasonically dispersed and resulting slurry is filtered and dried. The dried powder is spread on Toray carbon paper and the powder pressed (500 psi) and sintered at 340° C. approximately for 30 minutes in the absence of oxygen.

Figure 7A:
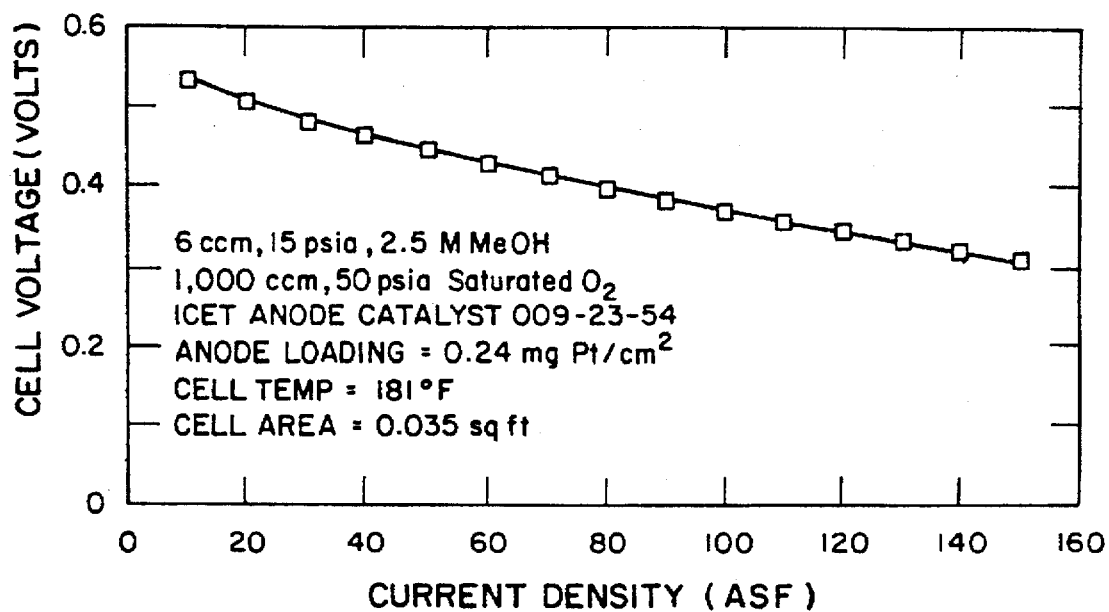
FIGS. 7a–7c are graphs showing the behavior of full cells including anodes treated in accordance with the present invention.
Figure 7B:
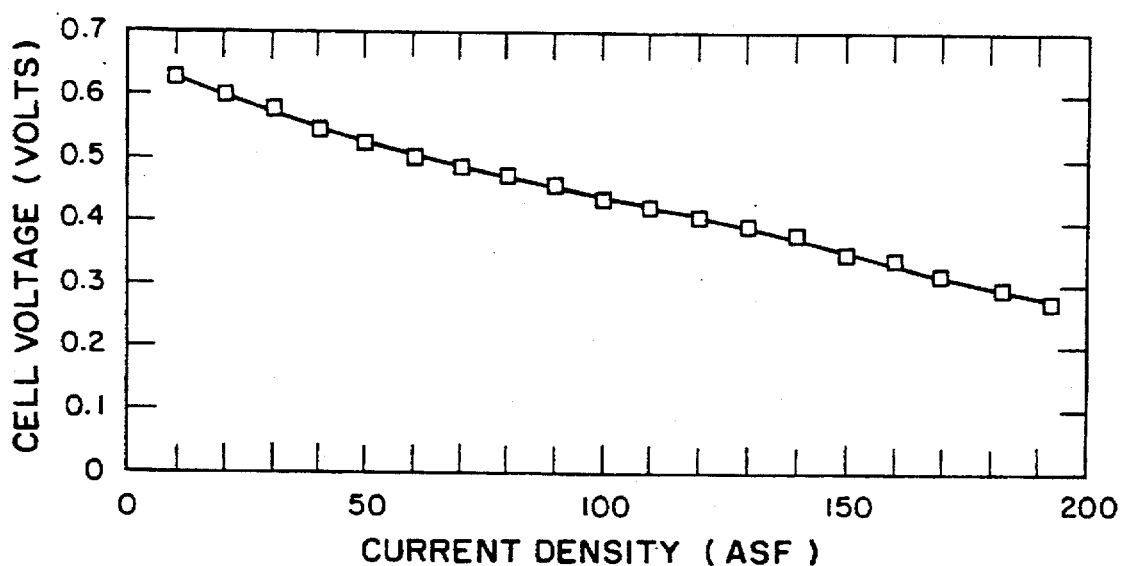
Figure 7C:
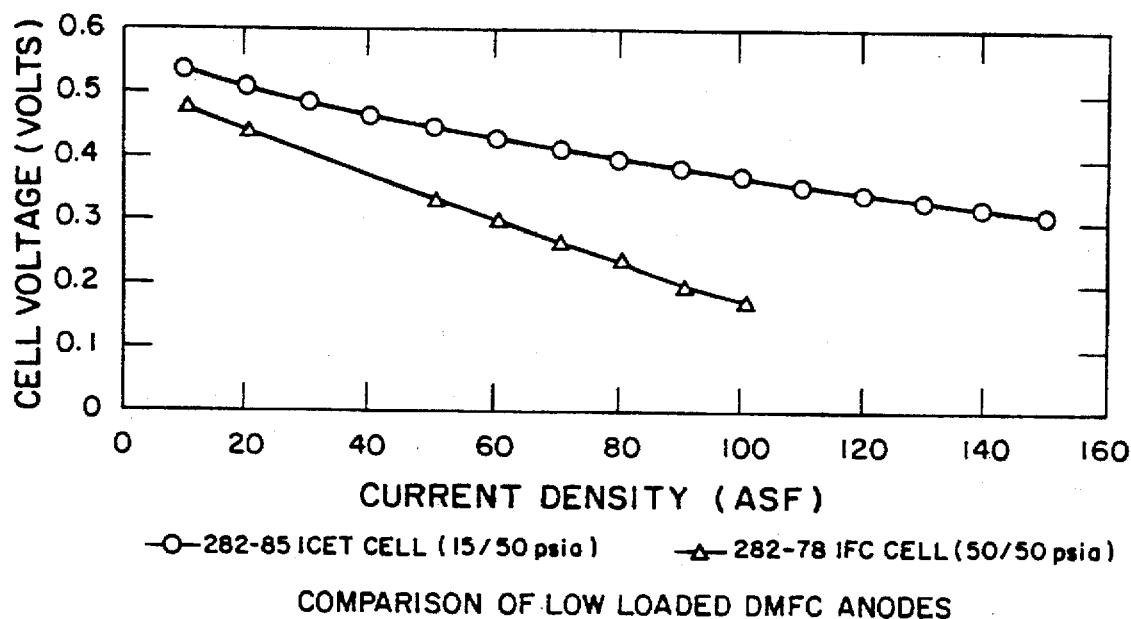

The results of the full cell testing are shown in FIGS. 7a–7c. The bpm-Ru combination was studied in detail both with 20% Pt/C as well as with Pt black (FIGS. 7a and 7b). FIG. 7c compares the performance of a supported 20 w% Pt, 10 w%Ru (Johnson Matthey) catalyst at 0.56 mg Pt/cm$^2$ to Rubpm 10% on 20% Pt (0.24 mg/cm$^2$ Pt). A substantially better performance by the Rubpm promoted system is seen compared to the high ruthenium catalyst.

I claim:

1. A fuel cell electrode for use in the oxidation of methanol or methanol reformate in a fuel cell, said electrode comprising an anode with a platinum electrocatalyst including and a redox promoter.

2. The fuel cell electrode of claim 1 wherein said redox promoter is a metal complex derived from one or more organic or polymeric ligands.

3. The fuel cell electrode of claim 2 wherein said anode further comprises high area carbons and wherein said metal complex is directly chemisorbed from a solution of said ligands onto said high area carbons.

4. The fuel cell electrode of claim 3 wherein said one or more ligands are covalently attached to said high area carbons using a coupling agent to carbon surface-OH groups.

5. The fuel cell electrode of claim 2 wherein said metal complex is a ruthenium or tin complex of macrocyclic ligands.

6. The fuel cell electrode of claim 1 wherein said anode further comprises high area carbons and wherein said platinum is deposited as a high area powder on said carbon.

7. An anode of a fuel cell electrode used for oxidizing methanol or methanol reformate in a fuel cell, said anode comprising a platinum electrocatalyst and a redox promoter.

8. The anode of claim 7 wherein said redox promoter is a metal complex derived from one or more organic or polymeric ligands.

9. The anode of claim 8 wherein said anode further comprises high area carbons and wherein said metal complex is directly chemisorbed from a solution of said ligands onto said high area carbons.

10. The anode of claim 8 wherein said one or more ligands are covalently attached to said high area carbons using a coupling agent to carbon surface-OH groups.

11. The anode of claim 8 wherein said metal complex is a ruthenium or tin complex of macrocyclic ligands.

12. The anode of claim 7 wherein said anode further comprises high area carbons and wherein said platinum is deposited as a high area power on said carbon.

* * * * *